Dec. 1, 1964 D. A. McLEAN ETAL 3,159,556

STABILIZED TANTALUM FILM RESISTORS

Filed Dec. 8, 1960

INVENTORS: D.A. MC LEAN
W.J. PENDERGAST
BY
[signature]
ATTORNEY 3,159,556

STABILIZED TANTALUM FILM RESISTORS

David A. McLean, Chatham, and Warren J. Pendergast, Murray Hill, N.J., assignors to Bell Telephone Laboratories, Incorporated, New York, N.Y., a corporation of New York Filed Dec. 8, 1960, Ser. No. 74,691
2 Claims. (Cl. 204—37)

Figure 1:
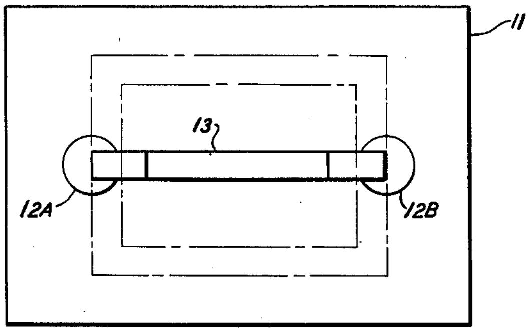

This invention relates to a method for producing stabilized metal film resistors, and to the resistors so produced.

A widely used method for reducing the size of electrical apparatus is the substitution of printed circuits for conventional wiring. The advent of semiconductive devices has made possible miniaturization of entire circuits. These developments have created a need for precise, accurate methods of producing printed circuit components such as resistors and capacitors. A copending application, Serial No. 845,754, describes a process for the production of precision metal film resistors which are suitable for use in printed circuit applications.

Heretofore, conventional printed circuit resistors consisted of an array of parallel lines which were connected at alternate ends to form a continuous path. The configuration also included "shorting bars" which served to connect alternate lines thereby shorting out the resistance of the line intermediate the two connected lines. The resistor was designed to have a resistance which was lower than the desired value, and adjustment was made by cutting through an appropriate number of shorting bars. By reason of the nature of this prior art adjustment method, tolerances of resistors so produced were of the order of ±5 percent.

The next step in the development of printed circuit resistors is described in the copending application alluded to hereinbefore wherein a film forming metal is deposited on a substrate in a configuration such that the resistance of the deposited layer is less than that ultimately desired. Subsequently, the deposited layer is anodized to convert a portion of the metal layer thickness to the oxide form, thereby increasing the resistance of the layer. Anodization is continued until the resistance of the metal layer attains a desired value as indicated by a monitoring means. The use of this method produces resistors with tolerances of ±1 percent.

Figure 2:
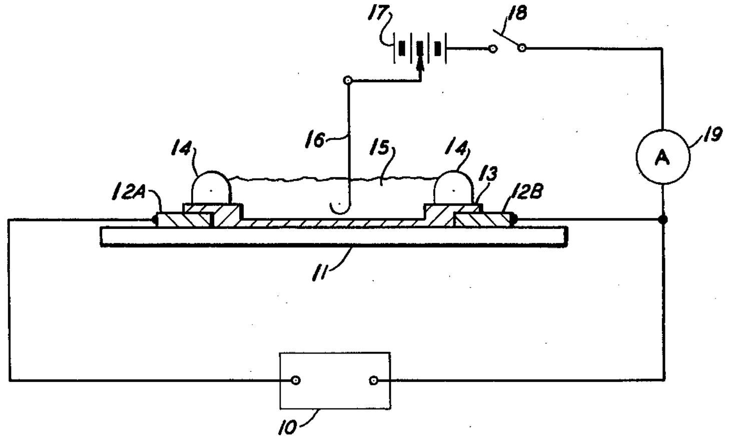

In accordance with this invention metal film resistors of improved stability are prepared by an anodizing treatment in combination with thermal preaging. The first step in the production of the inventive resistors is the deposition of a thin layer of a film forming metal. Metals such as tantalum, titanium, zirconium, aluminum and niobium are suitable for this purpose. The configuration and thickness of the deposited layer are chosen so that the resistance of the deposited layer is less than that ultimately desired. The deposited layer is then electrolytically anodized in the customary manner to convert a portion of the metal layer thickness to the oxide form, a dielectric, thereby increasing the resistance of the layer. This step alone results in stabilization. However, it has been determined that additional stabilization may be realized if the metal film plus oxide is heat treated at elevated temperatures in air. The invention may be more readily understood by reference to the drawing in which:

FIG. 1 is a plan view of a substrate with a layer of film forming metal deposited thereon in accordance with the present invention; and FIG. 2 is a schematic view of a device undergoing process showing anodization of a layer of film forming metal in accordance with the inventive method.

With reference more particularly to FIG. 1, there is shown a substrate 11 composed of one of the refractory insulating materials usually employed in the construction of printed circuit boards, which has deposited thereon two terminals, 12A and 12B, of electrically conductive metal such as gold, silver or copper, and a layer 13 of a film forming metal such as tantalum. Conductive terminals 12A and 12B are not essential to the practice of this invention. However, such terminals have been included in the description because they are customarily employed in the construction of printed circuit boards. The configuration and thickness of tantalum layer 13 are chosen so that the resistance of the layer measured by the terminals 12A and 12B is less than the desired value. The resistance of layer 13 is increased by electrolytic anodization.

Anodization of layer 13 requires that it be in contact with a suitable electrolyte. To this end strips of electroplater's tape are placed on substrate 11 to cover the area within the dashed lines shown in FIG. 1. A dam of a suitable plastic material such as beeswax is then constructed on the tape to confine the electrolyte and prevent it from contacting terminals 12A and 12B. A schematic diagram of the anodization step is shown in FIG. 2.

Shown in FIG. 2 is substrate 11, terminals 12A and 12B and tantalum layer 13. Walls 14 of the dam are also shown, the electroplater's tape being omitted to simplify explanation. Electrolyte 15 which is contained by dam walls 14 may be any one of the conventional anodizing electrolytes, such as a solution consisting of water, ethylene glycol and oxalic acid. Cathode 16 which is immersed in electrolyte 15 is conveniently composed of tantalum or platinum. The electrical circuit connecting cathode 16 and terminal 12B includes variable direct current power supply 17, switch 18, and ammeter 19 disposed as shown. Anodization of layer 13 is initiated by closing switch 18 and applying a low direct current voltage between cathode 16 and layer 13. The surface of layer 13 in contact with electrolyte 15 is connected to the oxide form the extent of such conversion being directly dependent on the voltage applied. The anodizing voltage is gradually increased, maintaining the current density at a low flow until a film of the desired thickness is produced. Switch 18 is then opened terminating the anodizing process.

The film forming metal may be initially deposited by sputtering or vacuum evaporation techniques. The configuration and thickness of the film are determined by the ultimate value of resistance desired. The initial thickness of the deposited film is preferably above 400 angstroms. This value is based on two factors; first, the metal thickness subsequent to anodization is preferably greater than 300 angstroms to assure continuity, and, second, conversion of at least 100 angstroms to oxide is preferable from the standpoint of ease of operation.

There is no upper limit of initial film thickness dictated by consideration of the inventive process. Any film thickness which conforms to the desired ultimate resistance value is suitable. For practical purposes it has been determined that 4,000 angstroms is suitable. However, a maximum of 25,000 angstroms could be employed.

The anodizing procedure employed in the present method is governed by all the factors generally encountered in conventional anodization procedures. Any one of the customary electrolytes, such as a dilute aqueous solution of nitric acid, boric acid, acetic acid or citric acid may be employed. Anodization is initiated at a relatively low voltage in accordance with conventional procedures. The upper limit of anodizing voltage is approximately 400 volts since higher voltages may induce unwanted side effects such as scintillation or corrosion. Based on this maximum figure and by rate of conversion of 7 to 10 angstroms per volt, approximately 3,000 to 4,000 angstroms of metal film thickness may be converted to oxide.

The anodization step alone results in stabilization of the metal film resistors, but additional stability is realized when the metal film plus the oxide is heat treated at elevated temperatures in air. During the preaging treatment temperatures within the range of 200 to 400° C. are employed. For values lower than 200° C. the rate of the reaction producing stabilization is so slow as to be impractical whereas the use of temperatures appreciably beyond 400° C. permit acceleration of the oxidation reaction with resultant loss of control. The thermal preaging is conducted for a time period of the order of 2 to 10 hours.

Data obtained by the practice of the present invention are set forth in Tables I and II below. Column 1 indicates the initial thickness of the deposited film, column 2 shows the anodizing voltage utilized, and column 3 lists the percentage change in resistance after 400 hours on life test at 100° C. (Table I) and after 1,000 hours on life test at 100° C. (Table II). The particular treatments employed are in accordance with the following schedule:

A. No thermal preaging prior or subsequent to anodization.

B. Thermal preaging for 2½ hours at 25° C. before anodizing.

C. Thermal preaging for 2½ hours at 250° C. after anodizing.

*Table I*

| Column 1 Film Thickness | Column 2 Anodizing Voltage | Column 3 Treatment | | |
|---|---|---|---|---|
| | | A | B | C |
| 500 Angstroms | 0 | 3.0 | .083 | -------- |
| | 25 | 1.2 | .62 | .16 |
| 1,000 Angstroms | 0 | 10.3 | −1.3 | -------- |
| | 25 | 4.8 | −.72 | −.23 |
| | 50 | 1.09 | .005 | −.035 |
| | 100 | 1.7 | 1.9 | -------- |
| 2,000 Angstroms | 0 | 2.35 | .14 | -------- |
| | 25 | 11.1 | .20 | .02 |
| | 50 | 3.06 | −.20 | −.18 |
| | 100 | 1.05 | .21 | .07 |

*Table II*

| Column 1 Film Thickness | Column 2 Anodizing Voltage | Column 3 Treatment | | |
|---|---|---|---|---|
| | | A | B | C |
| 500 Angstroms | 0 | 4.3 | .12 | -------- |
| | 25 | 2.5 | 1.10 | .16 |
| 1,000 Angstroms | 0 | 14.0 | −2.6 | -------- |
| | 25 | 4.8 | −1.4 | −.47 |
| | 50 | 1.23 | −.14 | −.14 |
| | 100 | 2.1 | 2.5 | -------- |
| 2,000 Angstroms | 0 | 2.85 | .30 | -------- |
| | 25 | 12.2 | .37 | −.088 |
| | 50 | 3.55 | −.50 | −.35 |
| | 100 | 1.10 | .25 | .11 |

The procedure employed in obtaining the data set forth above was as follows:

A film of tantalum of the order of 500, 1,000 and 2,000 angstroms in thickness was deposited on a refractory substrate (1½ x 3 inches) in accordance with conventional sputtering techniques. The tantalum film was disposed on the substrate so that the ends thereof were in contact with gold terminals which had been previously formed on the substrate. Electroplater's tape was placed on the substrate to form a rectangle in such a manner that substantially all of the tantalum layer was exposed within the rectangle. A rectangular dam of beeswax approximately 0.2 centimeter high was constructed on the tape.

An electrolyte consisting of an aqueous oxalic acid solution, 5 percent by weight, was introduced into the dammed area. A tantalum wire cathode, variable direct current power supply and ammeter were connected substantially as shown in FIG. 2.

Following the anodization treatment the metal film resistors were thermally preaged by baking for 2½ hours at a temperature of 250° C. in an oven controlled to ±2° C. Stabilities were then determined by aging at 100° C. for 1,000 hours.

The results set forth above in the tables lead to the conclusion that treatment "C". is a method which ultimately produces resistors of the highest stability. It is clear from these values that a resistor of a given value may more effectively be prepared when using the process "C," that is, when anodizing before heat treatment than in either method "A" or "B."

As further evidence of the improved results obtained by the use of the novel procedure reference is made to Tables III and IV wherein resistors prepared in accordance with the procedure outlined above were observed in order to determine percentage change in resistance after 672 hours on life test at 150° C. (Table III) and after 700 hours on life test at 150° C. Column 1 of each table indicates the percentage change of resistance for resistors which were thermally aged at 200° C. for 2½ hours but were not anodized and column 2 of each table indicates the percentage change in resistance for resistors anodized and preaged for 2½ hours at 250° C.

*Table III*

| Resistor | Unanodized—Thermally Preaged | Anodized +Preaged |
|---|---|---|
| | *Percent* | *Percent* |
| 1 | 2.784 | |
| 2 | | 1.324 |
| 3 | 1.915 | |
| 4 | | 1.168 |
| 5 | 1.658 | |
| 6 | | 0.739 |
| 7 | 1.308 | |
| 8 | | 0.639 |
| 9 | | 1.275 |
| 10 | 1.107 | |
| 11 | | 0.501 |
| 12 | 0.853 | |
| 13 | | 0.364 |
| 14 | 0.877 | |
| 15 | | 0.308 |
| 16 | 0.771 | |
| 17 | | 0.319 |
| 18 | | 0.420 |

Table *IV*

| Resistor | Unanodized—Thermally Preaged | Anodized +Preaged |
|---|---|---|
| | *Percent* | *Percent* |
| 1 | 0.573 | |
| 2 | | 0.141 |
| 3 | 0.493 | |
| 4 | | 0.124 |
| 5 | 0.568 | |
| 6 | | 0.201 |
| 7 | 0.406 | |
| 8 | | 0.131 |
| 9 | 0.346 | |
| 10 | 0.240 | |
| 11 | | 0.182 |
| 12 | 0.658 | |
| 13 | | 0.070 |
| 14 | 0.619 | |
| 15 | | 0.110 |
| 16 | 0.487 | |
| 17 | | 0.202 |
| 18 | 0.261 | |

Although a specific electrolyte and specific film forming metal were employed in the illustrative examples described above, it is to be understood that the present invention may be practiced with any film forming metal and utilizing any anodizing media. It is to be appreciated that the scheme depicted in FIG. 2 for restricting the area of contact of electrolyte is merely illustrative and any equivalent method, such as the use of a photoresist mask, is suitable. Variations in the described process may be made by one skilled in the art without departing from the spirit and scope of the present invention.

What is claimed is:

1. The method of preparing a stabilized metal film resistor comprising the steps of depositing on a substrate a layer of a film forming metal consisting essentially of tantalum in a configuration such that an electrical path through said layer in a direction transverse to the thickness thereof has an electrical resistance lower than that ultimately desired, decreasing the thickness of said layer by electrolytic anodization until the resistance of said electrical path substantially equals the desired value whereby said tantalum layer is partially converted to the oxide form, thermally aging said resistor in air at a temperature within the range of 200–400° C. for a time period within the range of 2 to 10 hours, thereby stabilizing the unoxidized portion of said tantalum layer and attaching two spaced electrical leads to said layer.

2. The method according to the procedure of claim 1 wherein said thermal aging is conducted at 250° C. for 2½ hours.

References Cited in the file of this patent

UNITED STATES PATENTS

| | | |
|---|---|---|
| 2,169,594 | Schellenger | Aug. 15, 1939 |
| 2,174,840 | Robinson | Oct. 3, 1939 |
| 2,743,400 | Bujan | May 29, 1951 |
| 2,885,524 | Eisler | May 5, 1959 |
| 2,950,996 | Place et al. | Aug. 30, 1960 |

FOREIGN PATENTS

| | | |
|---|---|---|
| 444,892 | Great Britain | Mar. 26, 1936 |
| 601,636 | Great Britain | May 10, 1948 |
| 1,189,974 | France | Mar. 31, 1959 |